US008316958B2

(12) United States Patent
Schell et al.

(10) Patent No.: US 8,316,958 B2
(45) Date of Patent: Nov. 27, 2012

(54) CONTROL SCHEME FOR DETECTING AND PREVENTING TORQUE CONDITIONS IN A POWER TOOL

(75) Inventors: Craig A. Schell, Street, MD (US); Michael K. Forster, White Hall, MD (US)

(73) Assignee: Black & Decker Inc., Newark, DE (US)

( * ) Notice: Subject to any disclaimer, the term of this patent is extended or adjusted under 35 U.S.C. 154(b) by 1554 days.

(21) Appl. No.: 11/486,360

(22) Filed: Jul. 13, 2006

(65) Prior Publication Data

US 2008/0011102 A1 Jan. 17, 2008

(51) Int. Cl.
*B23Q 5/28* (2006.01)

(52) U.S. Cl. ......... 173/178; 173/171; 173/216; 173/217

(58) Field of Classification Search ............. 173/2, 171, 173/183, 216, 217, 178
See application file for complete search history.

(56) References Cited

U.S. PATENT DOCUMENTS

| | | | |
|---|---|---|---|
| 3,847,229 | A | 11/1974 | Wanner et al. |
| 4,066,133 | A | 1/1978 | Voss |
| 4,249,117 | A | 2/1981 | Leukhardt et al. |
| 4,267,914 | A | 5/1981 | Saar |
| 4,426,588 | A | 1/1984 | Weilnmann |
| 4,448,261 | A | 5/1984 | Kousek et al. |
| 4,573,556 | A | 3/1986 | Andreasson |
| 4,628,233 | A | 12/1986 | Bradus |
| 4,638,870 | A | 1/1987 | Kousek |
| 5,036,925 | A | 8/1991 | Wache |
| 5,201,373 | A | 4/1993 | Bloechle |
| 5,401,124 | A | 3/1995 | Hettich |
| 5,584,619 | A | 12/1996 | Guzzela |
| 5,704,435 | A | 1/1998 | Meyer |
| 5,754,019 | A | 5/1998 | Walz |
| 5,879,111 | A | 3/1999 | Stock et al. |
| 5,895,850 | A | 4/1999 | Buestgens |
| 5,914,882 | A | 6/1999 | Yeghiazarians |
| 5,954,457 | A | 9/1999 | Stock et al. |
| 5,984,020 | A | 11/1999 | Meyer et al. |
| 5,996,707 | A | 12/1999 | Thome et al. |
| 6,044,918 | A | 4/2000 | Noser et al. |
| 6,055,142 | A | 4/2000 | von Keudell et al. |
| 6,111,515 | A | 8/2000 | Schaer et al. |
| 6,364,318 | B1 | 4/2002 | Bedi et al. |
| 6,415,875 | B1 | 7/2002 | Mexner et al. |
| 6,479,958 | B1 | 11/2002 | Thompson et al. |
| 6,700,341 | B2 | 3/2004 | Schaer et al. |
| 6,834,730 | B2 * | 12/2004 | Gass et al. ........................ 173/2 |
| 6,843,140 | B2 | 1/2005 | Osselmann et al. |

(Continued)

FOREIGN PATENT DOCUMENTS

| | | |
|---|---|---|
| DE | 2541298 | 3/1976 |

(Continued)

*Primary Examiner* — Rinaldi Rada
*Assistant Examiner* — Nathaniel Chukwurah
(74) *Attorney, Agent, or Firm* — Harness, Dickey & Pierce, P.L.C.

(57) ABSTRACT

A control scheme is provided for a power tool having a rotary shaft. The control scheme includes: monitoring rotational motion of the tool generally about a longitudinal axis of the shaft; detecting a condition of the tool based on the rotational motion of the tool; and controlling torque imparted to the shaft upon detecting the tool condition, where the torque is inversely related to an angular displacement of the tool about the longitudinal axis of the shaft.

16 Claims, 6 Drawing Sheets

U.S. PATENT DOCUMENTS

| | | | |
|---|---|---|---|
| 6,843,141 | B2 | 1/2005 | Spielmann et al. |
| 6,960,894 | B2 | 11/2005 | Carusillo et al. |
| 7,011,165 | B2 | 3/2006 | Kristen et al. |
| 7,055,620 | B2 | 6/2006 | Nadig et al. |
| 7,372,226 | B2 | 5/2008 | Wiker et al. |
| 2001/0042630 | A1 | 11/2001 | Kristen et al. |
| 2002/0033267 | A1 | 3/2002 | Schweizer et al. |
| 2003/0116332 | A1 | 6/2003 | Nadig et al. |
| 2004/0011632 | A1 | 1/2004 | Hellmann et al. |
| 2004/0211573 | A1 | 10/2004 | Carrier et al. |
| 2004/0226728 | A1 | 11/2004 | Boeni et al. |
| 2006/0081368 | A1 | 4/2006 | Rosine et al. |
| 2006/0081386 | A1 | 4/2006 | Zhang |
| 2007/0114050 | A1 | 5/2007 | Baumann et al. |
| 2011/0007436 | A1 | 1/2011 | Single et al. |

FOREIGN PATENT DOCUMENTS

| | | |
|---|---|---|
| DE | 3128410 | 2/1983 |
| DE | 3519803 | 12/1985 |
| DE | 4334933 | 10/1993 |
| DE | 4330823 | 3/1995 |
| DE | 4334863 | 4/1995 |
| DE | 4344817 | 6/1995 |
| DE | 19843452 | 3/2000 |
| DE | 10309414 | 9/2004 |
| DE | 10348756 | 5/2005 |
| DE | 10318798 | 1/2006 |
| DE | 202005017686 | 1/2006 |
| DE | 102006016441 | 10/2007 |
| DE | 10309414 | 1/2009 |
| DE | 10348756 | 1/2011 |
| EP | 0199883 | 8/1990 |
| EP | 0666148 | 8/1995 |
| EP | 0771619 | 5/2001 |
| EP | 1398119 | 3/2004 |
| EP | 1670134 | 6/2006 |
| GB | 2 086277 | 9/1981 |
| GB | 2306356 | 5/1997 |
| GB | 2400811 | 10/2004 |
| WO | WO 88/65508 | 9/1988 |

* cited by examiner

CONTROL SCHEME FOR DETECTING AND PREVENTING TORQUE CONDITIONS IN A POWER TOOL

FIELD

The present disclosure relates generally to power tools and, more particularly, to a control system for detecting and preventing torque conditions which may cause the operator to lose control of the tool.

BACKGROUND

In order for power tools, such as drills, to be effective at quickly drilling holes or driving fasteners, the tools must be able to deliver high levels of torque. In some instances, such torque levels can be difficult for users to control. For instance, when drilling a hole in soft steels the torque level can increase rapidly as the drill point starts to exit the material on the other side. In some instances, this aggressive cutting may stop drill bit rotation, thereby causing a strong reaction torque that is imparted to the tool operator as the motor turns the tool in the operator's grasp (rather than turning the drill bit). This phenomenon can occur quite rapidly and unexpectedly. In other instances, the twist condition is a slower phenomenon in which the torque level slowly increases until the operator loses control of the tool.

Therefore, it is desirable to provide a control system for addressing such varying conditions in power tools. The control system should be operable to detect torque conditions which may cause the operator to lose control of the tool and implement protective operations. Of particular interest, are protective operations that enable the operator to regain control of the tool without terminating or resetting operation of the tool.

The statements in this section merely provide background information related to the present disclosure and may not constitute prior art.

SUMMARY

A control scheme is provided for a power tool having a rotary shaft. The control scheme includes: monitoring rotational motion of the tool generally about a longitudinal axis of the shaft; detecting a condition of the tool based on the rotational motion of the tool; and controlling torque imparted to the shaft upon detecting the tool condition, where the torque is inversely related to an angular displacement of the tool about the longitudinal axis of the shaft.

In another aspect of this disclosure, the control scheme may pulse the torque imparted to the shaft such that the time between pulses enables the operator to regain control of the tool. The time between pulses may be reduced as the operator regains control of the tool.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
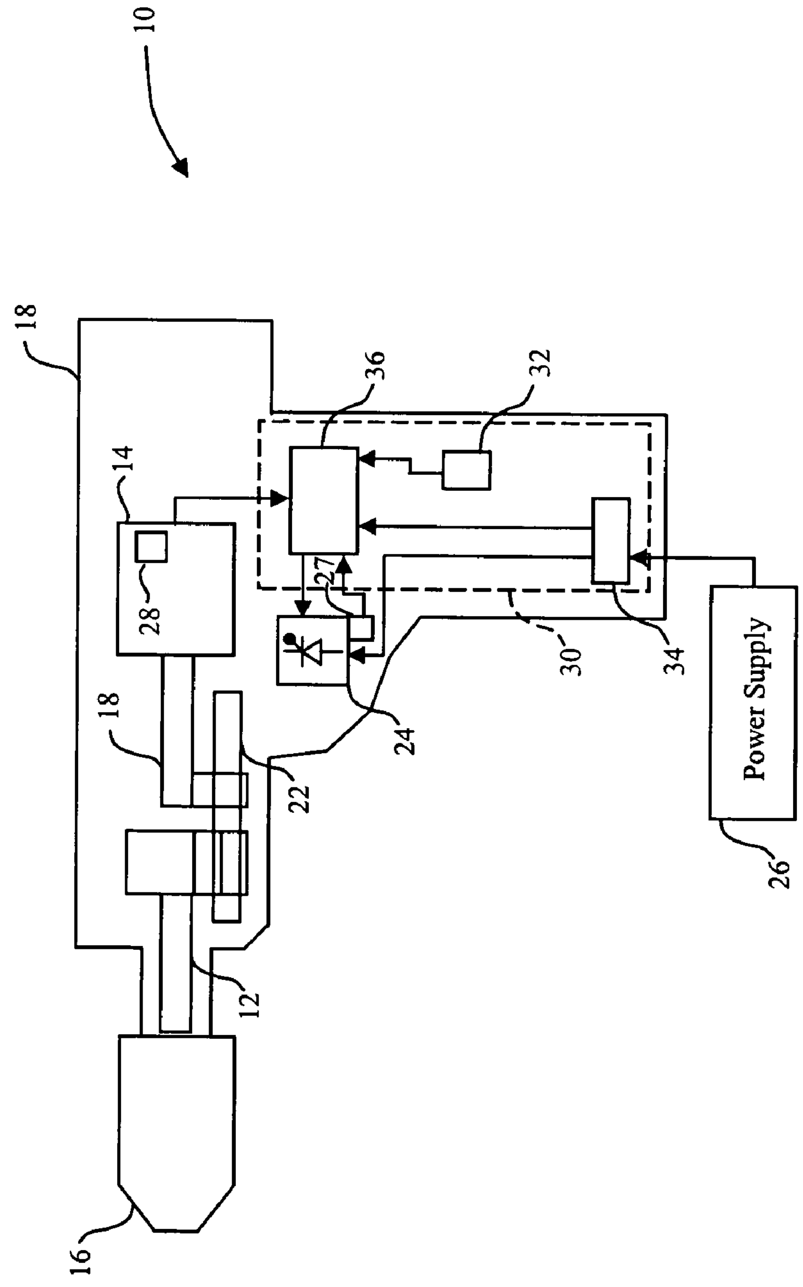
FIG. 1 is a diagram of an exemplary drill.

FIG. 1 illustrates an exemplary power tool 10 having a rotary shaft. In this example, the power tool is a hand held drill. While the following description is provided with reference to a drill, it is readily understood that the broader aspects of this disclosure are applicable to other types of power tools having rotary shafts, such as rotary hammers, circular saws, angle grinders, screw drivers and polishers.

In general, the drill includes a spindle 12 (i.e., a rotary shaft) drivably coupled to an electric motor 14. A chuck 16 is coupled at one end of the spindle 12; whereas a drive shaft 18 of the electric motor 14 is connected via a transmission 22 to the other end of the spindle 12. These components are enclosed within a housing 20. Operation of the tool is controlled through the use an operator actuated switch/control 24 embedded in the handle of the tool. The switch regulates current flow from a power supply 26 to the motor 14. Although a few primary components of the drill are discussed above, it is readily understood that other components known in the art may be needed to construct an operational drill.

The power tool 10 is also configured with a control system 30 for detecting and preventing torque conditions which may cause the operator to lose control of the tool. The control system 30 may include a rotational rate sensor 32, a current sensor 34, and a microcontroller 36 embedded in the handle of the power tool 10.

Under certain operating conditions, the power tool 10 may rotate in the operator's grasp. In a drill, the rotational rate sensor 32 is configured to detect rotational motion of the tool generally about the longitudinal axis of the spindle 12. Due to the complex nature of the rotational forces, it is understood that tool does not likely rotate precisely around the axis of the spindle. The rotational rate sensor 32 in turn communicates a signal indicative of any rotational motion to the controller 36 for further assessment. For different power tools, it is envisioned that the sensor may be disposed in a different location and/or configured to detect motion along a different axis.

In a preferred embodiment, the operating principle of the rotational rate sensor 32 is based on the Coriolis effect. Briefly, the rotational rate sensor is comprised of a resonating mass or pair of resonating masses. When the power tool is subject to rotational motion about the axis of the spindle, the resonating mass will be laterally displaced in accordance with the Coriolis effect, such that the lateral displacement is directly proportional to the angular rate. It is noteworthy that the resonating motion of the mass and the lateral movement of the mass occur in a plane which is orientated perpendicular to the rotational axis of the rotary shaft. Capacitive sensing elements are then used to detect the lateral displacement and generate an applicable signal indicative of the lateral displacement. An exemplary rotational rate sensor is the ADXRS150 or ADXRS300 gyroscope device commercially available from Analog Devices. Other types of rotational sensors, such as angular speed sensors, accelerometers, etc., are also within the scope of this disclosure.

Figure 2:
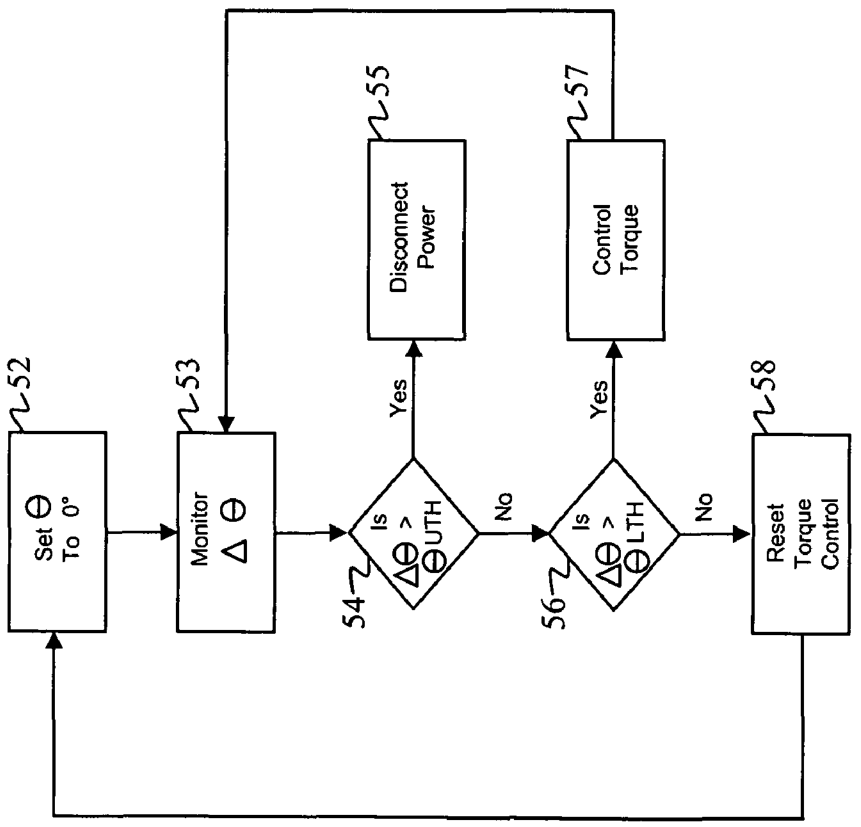
FIG. 2 is a flowchart illustrating an exemplary control scheme for a power tool.

With reference to FIG. 2, the microcontroller assesses the rotational motion of the tool to detect rotational conditions which may cause the operator to lose control of the tool. In this exemplary embodiment, angular displacement of the tool is monitored in relation to an angular starting position for the tool. During operation of the tool, the angular starting position is first set to zero as indicated at 51 and then angular displacement is monitored based on the rotational motion detected by the sensor. Relative displacement is what is important. Setting the initial state to zero is just one exemplary way to monitor relative displacement. Additionally, the starting position may be continually reevaluated and adjusted to allow for operator controlled movement from this starting position. For example, the starting position may be periodically updated using an averaging function; otherwise, angular displacement from this updated starting position is evaluated as described below.

When the angular displacement is within a first range (e.g., less than 20 degrees from the starting position), the operator is presumed to have control of the tool and thus no protective operations are needed. Angular displacement may be derived from the angular velocity measure reported by the rotational rate sensor. Likewise, it is envisioned that angular displacement may be derived from other types of measures reported by other types of rotational sensors.

Figure 3:
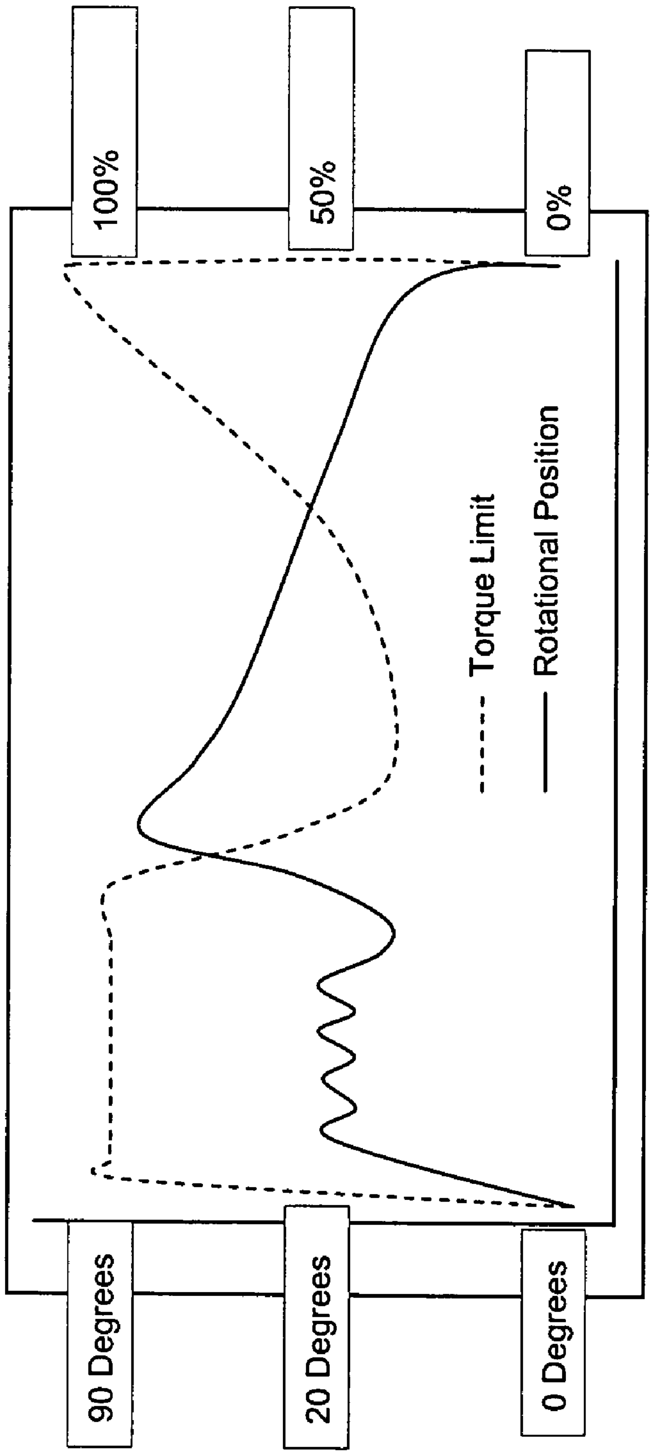
FIG. 3 is a graph depicting how the torque applied to the spindle of the tool in relation to the angular displacement of the tool.

When the angular displacement exceeds this first range, it may be presumed that the operator is losing control of the tool. In this second range of angular displacement (e.g., between 20° and 90°), the control scheme initiates a protective operation that enable the operator to regain control of the tool without terminating or resetting operation of the tool. For example, torque imparted to the spindle is controlled at 57 in a manner which may allow the operator to regain control of the tool. In particular, the torque applied to the spindle is inversely related to the angular displacement of the tool as shown in FIG. 3. As angular displacement increases, the amount of torque is decreased accordingly in hopes the operator can regain control of the tool. Likewise, as the operator regains control of the tool (i.e., angular displacement decreases), the amount of torque is increased. In an exemplary embodiment, the torque level falls off linearly from 20 to 90 degrees of angular displacement. In this way, the operation of the tool is self limiting based on the operator's ability to control the tool.

If angular displacement exceeds the second range (i.e., greater than 90°), it may be presumed that the operator has lost control of the tool. In this instance, a different protective operation may be initiated at 55 by the control scheme, such as disconnecting power to the motor or otherwise terminating operation of the tool. However, if the tool is rotated back within the first displacement range without exceeding the upper bound of the second range, the torque level is reset to 100%. Thus, the operator has regained control of the tool without terminating or resetting operation of the tool.

Additionally, these distinct ranges could be combined into one continuous state where a non-linear relationship between torque and displacement are applied. It is to be understood that only the relevant steps of the control scheme are discussed above in relation to FIG. 2, but that other software-implemented instructions may be needed to control and manage the overall operation of the system.

Different rotational conditions may be monitored using different criteria. For instance, it may be presumed that the operator is losing control of the tool when the angular velocity or the angular acceleration of the tool exceeds some defined threshold. These parameters may be assessed independently or in combination with the angular displacement of the tool. In addition, these types of parameters may be assessed in combination with parameters from other types of sensors, including but not limited to motor current or rate of current change, motor temperature, etc. It is readily understood that different control schemes may be suitable for different types of tools.

Figure 4:
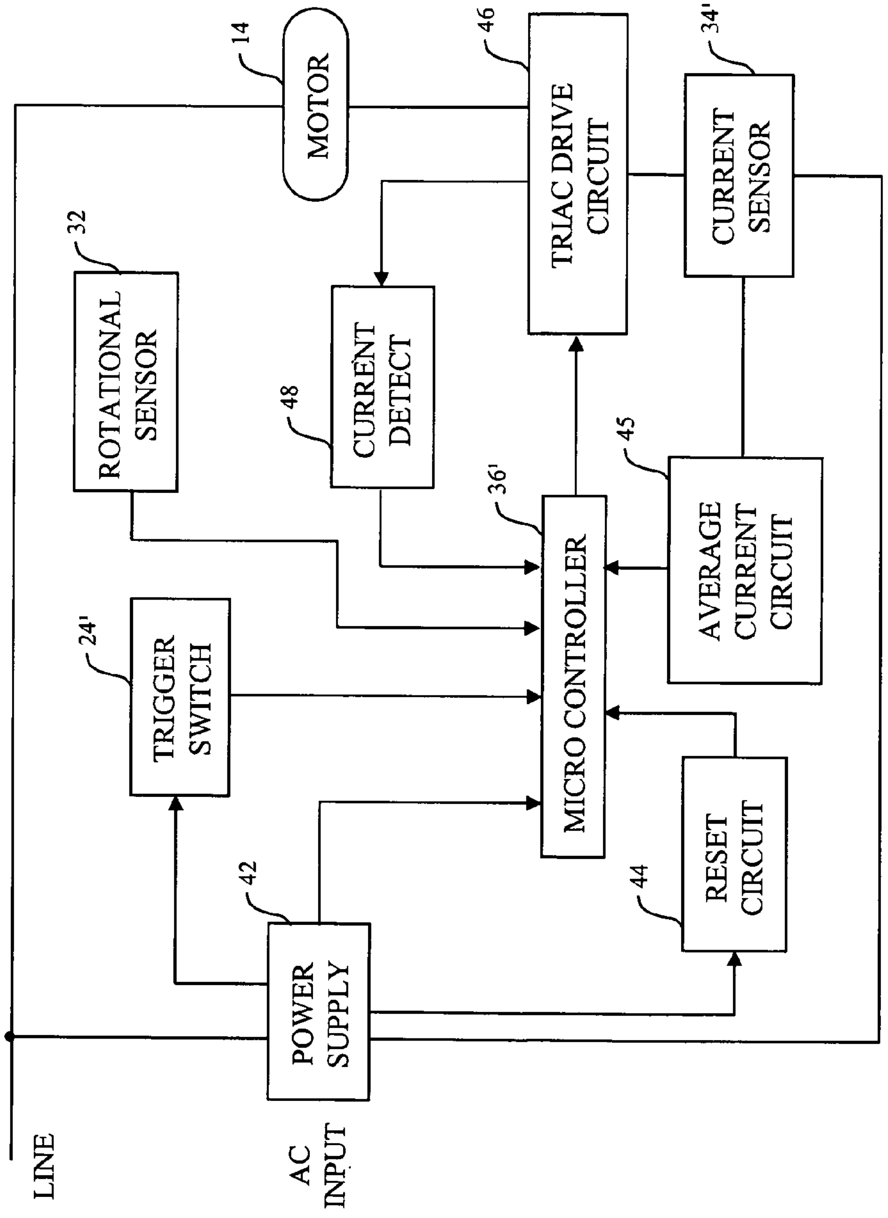
FIG. 4 is a diagram of an exemplary control circuit for an AC driven power tool.

Operation of an exemplary control circuit for an AC driven power tool is further described in relation to FIG. 4. A power supply circuit 42 is coupled to an AC power line input and supplies DC voltage to operate the microcontroller 36'. The trigger switch 24' supplies a trigger signal to the microcontroller 36' which indicates the position or setting of the trigger switch 24' as it is manually operated by the power tool operator. Drive current for operating the motor 14' is controlled by a triac drive circuit 46. The triac drive circuit 46 is, in turn, controlled by a signal supplied by microcontroller 36'.

The microcontroller 36' is also supplied with a signal from a current detector circuit 48. The current detector circuit 48 is coupled to the triac drive circuit 46 and supplies a signal indicative of the conductive state of the triac drive circuit 46. If for some reason the triac drive circuit 46 does not turn on in response to the control signal from the microcontroller 36', this condition is detected by the current detector circuit 48.

A current sensor 34' is connected in series with the triac drive circuit 46 and the motor 14'. In an exemplary embodiment, the current sensor 34' may be a low resistance, high wattage resistor. The voltage drop across the current sensor 34' is measured as an indication of actual instantaneous motor current. The instantaneous motor current is supplied to an average current measuring circuit 46 which in turn supplies the average current value to the microcontroller 36'.

In operation, the trigger switch 24' supplies a trigger signal to the microcontroller 36' that varies in proportion to the switch setting. Based on this trigger signal, the microcontroller 36' generates a control signal which causes the triac drive circuit 46 to conduct, thereby allowing the motor 14' to draw current. Motor torque is substantially proportional to the current drawn by the motor and the current draw is controlled by the control signal sent from the microcontroller to the triac drive circuit. Accordingly, the microcontroller can control the torque imparted by the motor in accordance with the control scheme described above.

Other techniques for controlling the torque imparted to the spindle are also within the scope of this disclosure. For example, DC operated motors are often controlled by pulse width modulation, where the duty cycle of the modulation is proportional to the speed of the motor and thus the torque imparted by the motor to the spindle. In this example, the microcontroller may be configured to control the duty cycle of the motor control signal in accordance with the control scheme described above.

Alternatively, the power too may be configured with a proportional torque transmitting device interposed between the motor and the spindle. In this example, the proportional torque transmitting device may be controlled by the microcontroller. The torque transmitting device may take the form of a magneto-rheologocical fluid clutch which can vary the torque output proportional to the current feed through a magnetic field generating coil. It could also take the form of a friction plate, cone clutch or wrap spring clutch which can have variable levels of slippage based on a preload holding the friction materials together and thus transmitting torque. In this case, the preload could be changed by driving a lead screw supporting the ground end of the spring through a motor, solenoid or other type of electromechanical actuator. Other types of torque transmitting devices are also contemplated by this disclosure.

Figure 5:
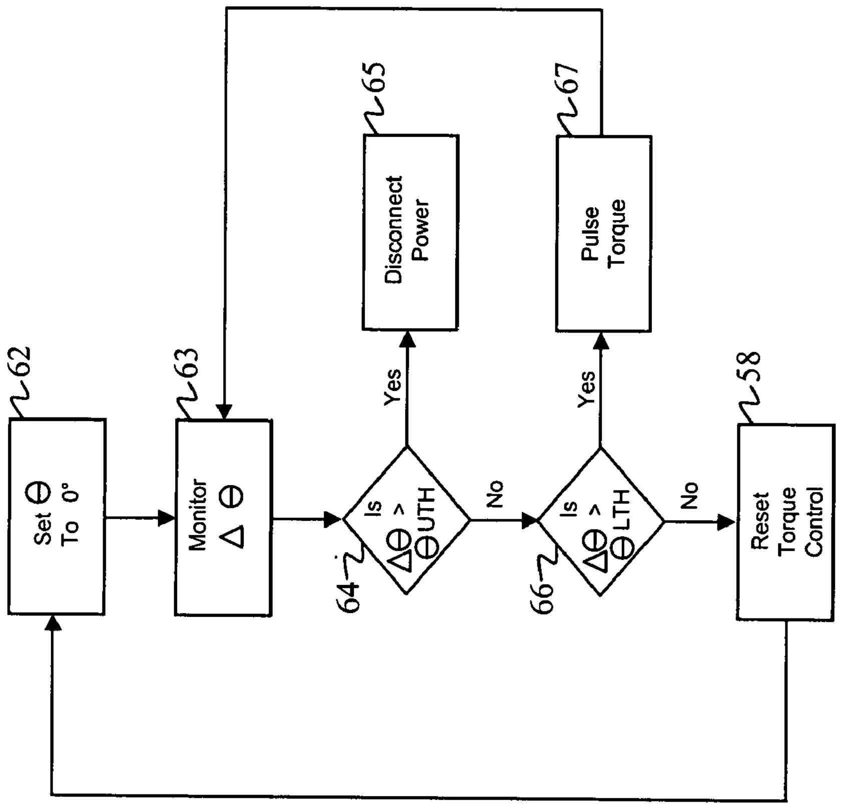
FIG. 5 is a flowchart illustrating another exemplary control scheme for a power tool.
Figure 6:
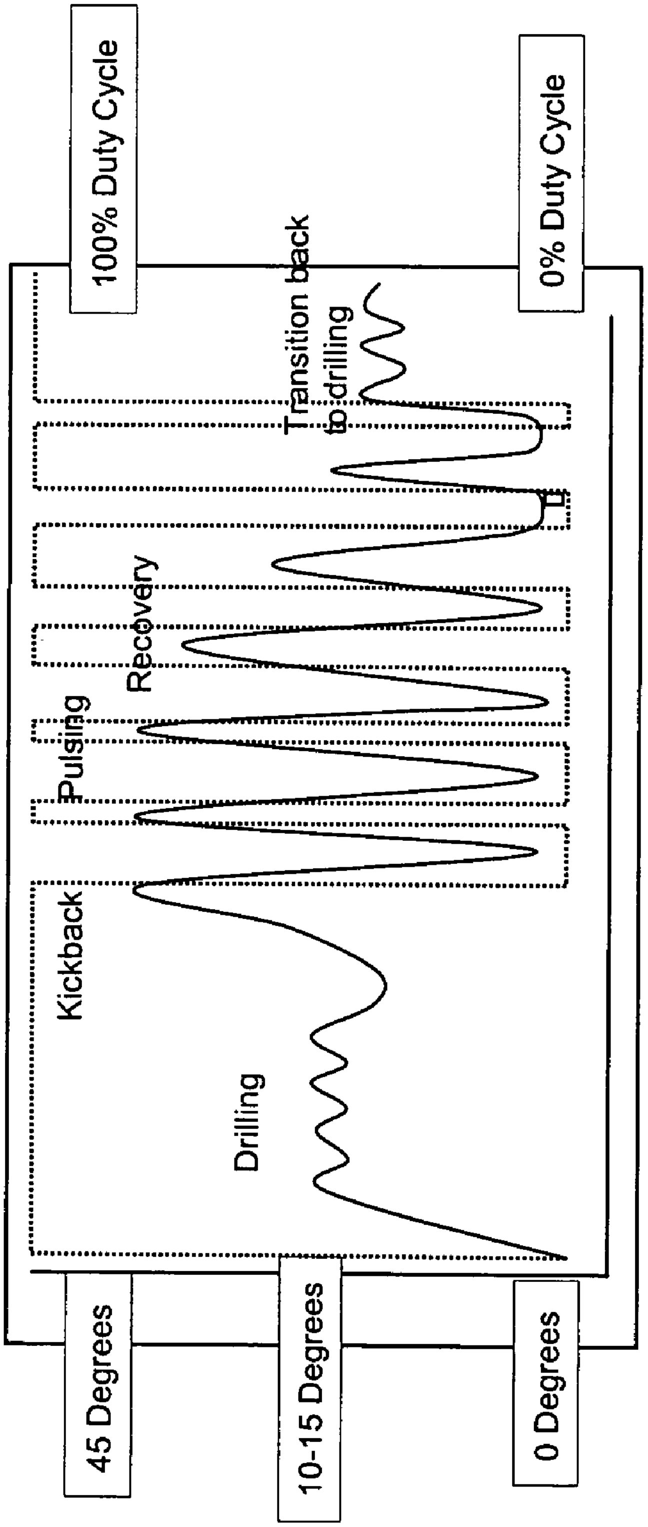
FIG. 6 is a graph depicting how the torque may be pulsed in relation to the angular displacement of the tool.

In another aspect of this disclosure, the control scheme may pulse the torque imparted to the shaft upon detecting certain rotational conditions as shown in FIGS. 5 and 6. With reference to FIG. 5, the angular displacement of the tool is again monitored at 63 in relation to an angular starting position for the tool. When the angular displacement is within a first range (e.g., less than 20 degrees from the starting position), the operator is presumed to have control of the tool and thus no protective operations are needed.

When the angular displacement exceeds this first range, it may be presumed that the operator is losing control of the tool. In this second range of angular displacement, the control scheme will pulse the torque applied to the spindle at 67 such that the time between pulses (e.g., 0.1-1.0 seconds) enables the operator to regain control of the tool. The time between pulses will correlate to the amount of angular displacement as shown in FIG. 6. As angular displacement increases, the time between pulses will increase. Similarly, as angular displacement decreases, the time between pulses will decrease. Other techniques described above for controlling the torque imparted on the spindle are also suitable for this control scheme.

If angular displacement exceeds the second range (i.e., greater than 90°), it may be presumed that the operator has lost control of the tool. In this instance, a different protective operation may be initiated at 65 by the control scheme, such as disconnecting power to the motor or otherwise terminating operation of the tool. However, if the tool is rotated back towards the starting angular position without exceeding the upper bound of the second range, the time between pulses may be reduced, thereby returning the tool to normal operating conditions without having to terminate or reset operation of the tool. Previous systems were disclosed which completely shut the motor down if an out of control state was determined. This required the operator to shut down the operation of the tool and restart it. Examples of regaining control could be improved balance or stance, but most commonly placing another hand on the tool to control rotation. By not taking torque all the way to zero the operator may see decreased process time to drill a hole. It could furthermore be possible to put the tool in reverse to help reduce the flywheel effects of stored energy in rotating components of the tool such as the motor armature and geartrain.

The control schemes described above can adapt to the strength and capabilities of the operator. If the operator can only control 500 inch pounds of torque, but the tool is capable of delivering 700 inch pounds of torque, the torque of the tool will match the capability after some angular displacement of the tool from its starting angular position. If more torque is desired, the operator can increase the torque by moving the tool closer to the rotational starting position. The above description is merely exemplary in nature and is not intended to limit the present disclosure, application, or uses.

What is claimed is:

1. A control scheme for a power tool having a rotary shaft, comprising:

monitoring rotational motion of the tool generally about a longitudinal axis of the shaft;

detecting a condition of the tool based on the rotational motion of the tool; and controlling torque imparted to the shaft upon detecting the tool condition, where the torque is inversely related to an angular displacement of the tool about the longitudinal axis of the shaft.

2. The control scheme of claim 1 wherein controlling torque further comprises decreasing the torque as angular displacement of the tool increases and increasing the torque as angular displacement of the tool decreases.

3. The control scheme of claim 1 wherein monitoring rotational motion of the tool further comprises determining angular displacement of the tool in relation to a starting angular position and controlling the torque imparted to the shaft inversely to the angular displacement when the angular displacement exceeds a threshold.

4. The control scheme of claim 3 wherein the torque is inversely related to the angular displacement once the angular displacement exceeds a first threshold and is reduced to zero once the angular displacement exceeds a second threshold, where the second threshold is greater than the first threshold.

5. The control scheme of claim 1 wherein monitoring rotational motion of the tool further comprises determining rotational speed of the tool about the longitudinal axis of the shaft and detecting the tool condition based in part of the rotational speed.

6. The control scheme of claim 1 wherein monitoring rotational motion of the tool further comprises determining rotational speed of the tool about the longitudinal axis of the shaft and deriving the angular displacement of the tool from the rotational speed of the tool.

7. The control scheme of claim 1 wherein detecting a condition of the tool further comprises comparing angular displacement of the tool to a displacement threshold and comparing rotational speed of the tool to based on the rotational motion of the velocity threshold.

8. The control scheme of claim 1 wherein controlling torque inversely related to the angular displacement of the tool until the angular displacement of the tool returns within an angular range of a starting angular position of the tool.

9. The control scheme of claim 1 wherein controlling the torque further comprises controlling rotational speed of a motor rotatably coupled to the rotary shaft.

10. The control scheme of claim 1 wherein controlling the torque further comprises controlling a proportional torque transmitting device interposed between a motor and the rotary shaft.

11. A control system suitable for use in a power tool, comprising:

a motor drivably coupled to a rotary shaft to impart rotary motion thereon;

a rotational rate sensor disposed within the tool and operable to detect rotational motion of the tool generally about a longitudinal axis of the shaft; and a controller electrically connected to the rotational rate sensor, the controller operable to detect a rotational condition of the tool based on the rotational motion detected by the sensor and control torque imparted to the rotary shaft upon detecting the rotational condition of the tool, wherein the torque is inversely related to an angular displacement of the tool about the longitudinal axis.

12. The control system of claim 11 wherein the controller determines angular displacement of the tool in relation to a starting angular position and controls the torque when the angular displacement exceeds a threshold.

13. The control system of claim 11 wherein the controller discontinues controlling the torque inversely to displacement when the angular displacement of the tool returns within an angular range of a starting angular position of the tool.

14. The control system of claim 11 wherein the controller controls the torque imparted to the rotary shaft by controlling rotational speed of the motor.

15. The control system of claim 11 further comprises a proportional torque transmitting device interposed between the motor and the rotary shaft, wherein the controller controls torque imparted to the rotary shaft using the proportional torque transmitting device.

16. The control system of claim 11 wherein the rotational rate sensor having a resonating mass is operable to detect lateral displacement of the resonating mass and generate a signal indicative of the detected lateral displacement, such that the lateral displacement is directly proportional to a rotational speed at which the power tool rotates about an axis of the rotary shafts further defined.

* * * * *

UNITED STATES PATENT AND TRADEMARK OFFICE

CERTIFICATE OF CORRECTION

PATENT NO. : 8,316,958 B2
APPLICATION NO. : 11/486360
DATED : November 27, 2012
INVENTOR(S) : Craig A. Schell et al.

It is certified that error appears in the above-identified patent and that said Letters Patent is hereby corrected as shown below:

Title Page, Item (56) References Cited, U.S. PATENT DOCUMENTS, "4,426,588", "Weilnmann" should be -- Weilenmann --.

Column 6,

Line 27 (Claim 7), "claim 1" should be -- claim 6 --.

Lines 29-31 (Claim 7), delete "and comparing rotational speed of the tool to based on the rotational motion of the velocity threshold".

Signed and Sealed this
Second Day of April, 2013

Teresa Stanek Rea
*Acting Director of the United States Patent and Trademark Office*